US012576787B2

(12) United States Patent
Means

(10) Patent No.: US 12,576,787 B2
(45) Date of Patent: Mar. 17, 2026

(54) MECHANICAL MOUNTING SYSTEM

(71) Applicant: Kevin Paul Means, Hereford, AZ (US)

(72) Inventor: Kevin Paul Means, Hereford, AZ (US)

( * ) Notice: Subject to any disclaimer, the term of this patent is extended or adjusted under 35 U.S.C. 154(b) by 16 days.

(21) Appl. No.: 18/733,724

(22) Filed: Jun. 4, 2024

(65) Prior Publication Data

US 2025/0229722 A1     Jul. 17, 2025

Related U.S. Application Data

(60) Provisional application No. 63/620,244, filed on Jan. 12, 2024.

(51) Int. Cl.
*B60R 9/04*     (2006.01)
*H01Q 1/32*     (2006.01)
(52) U.S. Cl.
CPC ............. *B60R 9/04* (2013.01); *H01Q 1/3275* (2013.01)
(58) Field of Classification Search
CPC ................................ B60R 9/04; H01Q 1/3275
See application file for complete search history.

(56) References Cited

U.S. PATENT DOCUMENTS

| | | | |
|---|---|---|---|
| 6,351,249 B1 | 2/2002 | Wolfe, Jr. | |
| 6,452,567 B1 | 9/2002 | Overton | |
| 6,618,018 B1 * | 9/2003 | Sylvester .................. | B60R 9/00 343/715 |

(Continued)

FOREIGN PATENT DOCUMENTS

| | | | |
|---|---|---|---|
| CN | 203623538 U | * | 6/2014 |
| CN | 107204508 | | 6/2017 |

(Continued)

OTHER PUBLICATIONS

HueyPilotVN RVForum online blog posting dated Jun. 25, 2023 tilled "New Product Review" for StaRVector mount for Starlink by Kevin Means, https://www.rvforum.net/threads/starvector-mount-for-starlink-by-kevin-means.910921/ (Year: 2023).*

(Continued)

*Primary Examiner* — Terrell L Mckinnon
*Assistant Examiner* — Ding Y Tan
(74) *Attorney, Agent, or Firm* — ROEDER & BRODER LLP; James P. Broder

(57)     ABSTRACT

A mechanical mounting system (100) and method for mounting an object (104) to a vehicle exterior (102E) of a vehicle (102). The mounting system (100) includes a base assembly (106) and a mounting assembly (108). The base assembly (106) is fixedly mountable to the vehicle exterior (102E). The mounting assembly (108) is movably coupled to the base assembly (106). The mounting assembly (108) includes a mounting aperture (108A). The mounting assembly (108) is configured to receive the object (104) so that at least a portion of the object (104) is extendable through the mounting aperture (108A). The mounting assembly (108) is movable relative to the base assembly (106) between an expanded configuration and a retracted configuration. The base assembly (106) can include a base frame (116) that defines a base perimeter (106P) of the base assembly (106). The mounting assembly (108) can include a mounting frame (130) that defines a mounting perimeter (108P) of the mounting assembly (108).

19 Claims, 8 Drawing Sheets

(56)                References Cited

U.S. PATENT DOCUMENTS

| | | | | |
|---|---|---|---|---|
| 2004/0169607 A1* | 9/2004 | Wang | H01Q 1/3275 |
| | | | | 343/711 |
| 2015/0071137 A1* | 3/2015 | Thiam | H01Q 1/521 |
| | | | | 343/702 |
| 2016/0031382 A1* | 2/2016 | Chinn | A61B 90/50 |
| | | | | 29/428 |
| 2017/0149124 A1* | 5/2017 | Fabre | H01Q 1/3291 |
| 2022/0131259 A1* | 4/2022 | Lee | H01Q 1/1214 |
| 2023/0093217 A1* | 3/2023 | Bongir | H01Q 1/1214 |
| | | | | 248/237 |
| 2024/0034246 A1* | 2/2024 | Aggarwal | F16B 47/00 |

FOREIGN PATENT DOCUMENTS

| | | |
|---|---|---|
| CN | 107000651 A | 8/2017 |
| CN | 208283468 U | 12/2018 |
| CN | 109167146 A | 1/2019 |
| CN | 209747710 | 5/2019 |
| CN | 208986167 U | 6/2019 |
| CN | 113034881 | 4/2021 |
| CN | 215219892 | 4/2021 |
| CN | 214707923 | 6/2021 |
| CN | 213957606 U | 8/2021 |
| CN | 110133330 A | 2/2022 |
| CN | 115314762 A | 11/2022 |
| DE | 202004011852 | 10/2004 |
| EP | 3087635 | 10/2016 |
| EP | 3510665 | 8/2017 |
| EP | 3923413 | 12/2021 |
| KR | 200259727 Y1 | 1/2002 |
| KR | 101842082 B1 | 3/2018 |
| WO | WO2016115295 | 1/2016 |

OTHER PUBLICATIONS

King MB700 quick release roof mount installation video on youtube dated Jan. 5, 2018 at https://www.youtube.com/watch?v=bbLDMlji2bg (Year: 2018).*

Star-Mount Systems online product page dated Feb. 23, 2023, /https://star-mountsystems.com/collections/mounts (Year: 2023).*

Starlink Gen 3 DIY vehicle mount youtube video by Moving Pictures Africa dated Jan. 11, 2024, https://www.youtube.com/watch?v=glGvhrFR00 (Year: 2024).*

Outback comms online product page dated Mar. 25, 2024 /https://outbackcomms.com.au/collections/brackets (Year: 2024).*

Ty Fenwick youtube video titled "I build a flat mount starlink then test it in outback Australia" dated Aug. 2, 2023 https://www.youtube.com/watch?v=2AMiBsGxV8A (Year: 2023).*

SataMount™ satellite dish standing seam mount bracket (Starlink compatible) online product pages, www.archive.org dated at Sep. 24, 2023 and https://satamount.com/ https://snoblox-snojax.com/products/satamount-satellite-dish-standing-seam-mounting-bracket-starlink-compatible.html (Year: 2023).*

Outback Comms., "The Rugged—Flat Mount for Starlink", 2023.

EET International, "B-Tech Flat Screen Wall Mount with Slide-Out AV Storage Tray, black", Aug. 11, 2022.

* cited by examiner

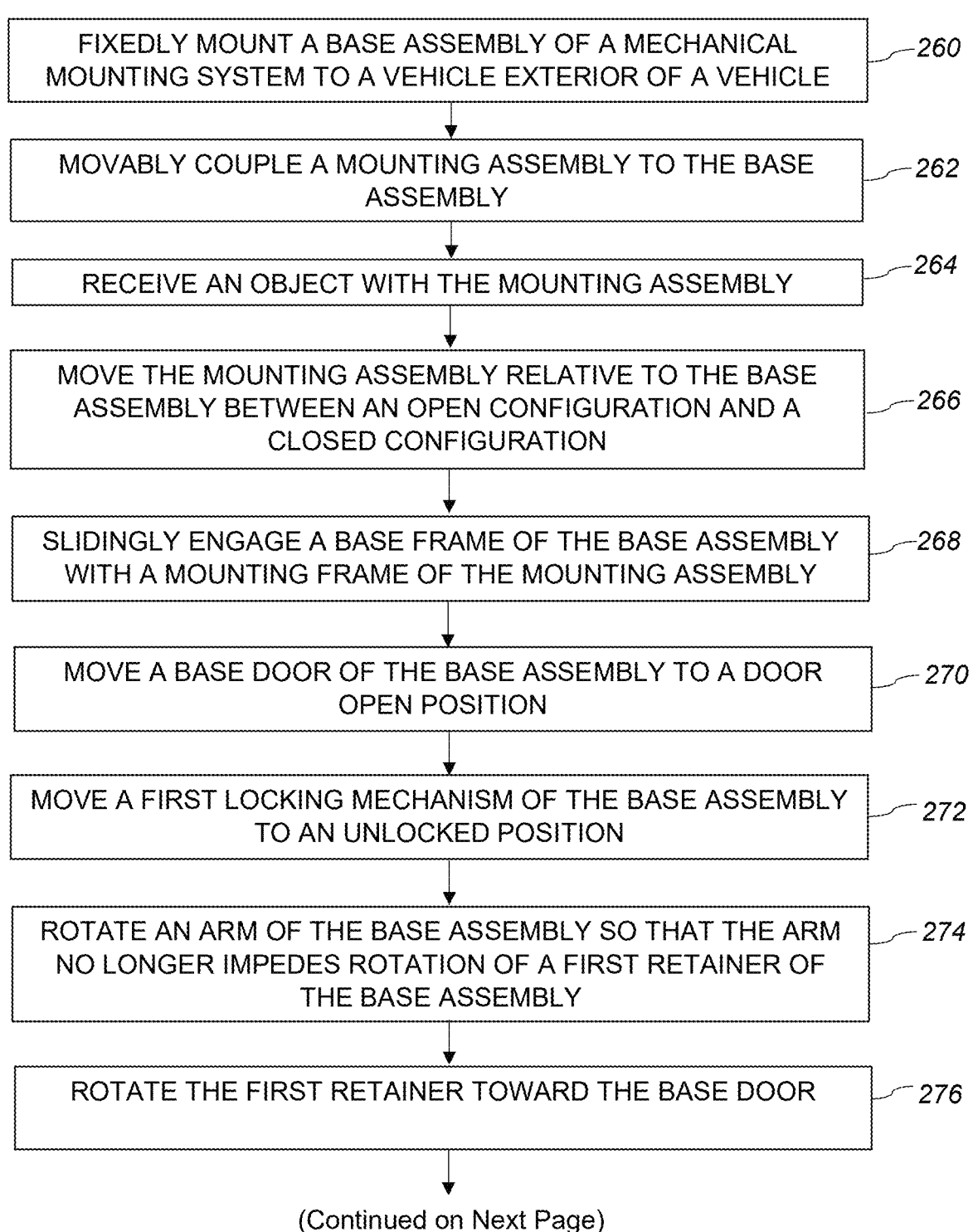

FIXEDLY MOUNT A BASE ASSEMBLY OF A MECHANICAL MOUNTING SYSTEM TO A VEHICLE EXTERIOR OF A VEHICLE — 260

MOVABLY COUPLE A MOUNTING ASSEMBLY TO THE BASE ASSEMBLY — 262

RECEIVE AN OBJECT WITH THE MOUNTING ASSEMBLY — 264

MOVE THE MOUNTING ASSEMBLY RELATIVE TO THE BASE ASSEMBLY BETWEEN AN OPEN CONFIGURATION AND A CLOSED CONFIGURATION — 266

SLIDINGLY ENGAGE A BASE FRAME OF THE BASE ASSEMBLY WITH A MOUNTING FRAME OF THE MOUNTING ASSEMBLY — 268

MOVE A BASE DOOR OF THE BASE ASSEMBLY TO A DOOR OPEN POSITION — 270

MOVE A FIRST LOCKING MECHANISM OF THE BASE ASSEMBLY TO AN UNLOCKED POSITION — 272

ROTATE AN ARM OF THE BASE ASSEMBLY SO THAT THE ARM NO LONGER IMPEDES ROTATION OF A FIRST RETAINER OF THE BASE ASSEMBLY — 274

ROTATE THE FIRST RETAINER TOWARD THE BASE DOOR — 276

(Continued on Next Page)

*FIG. 2*

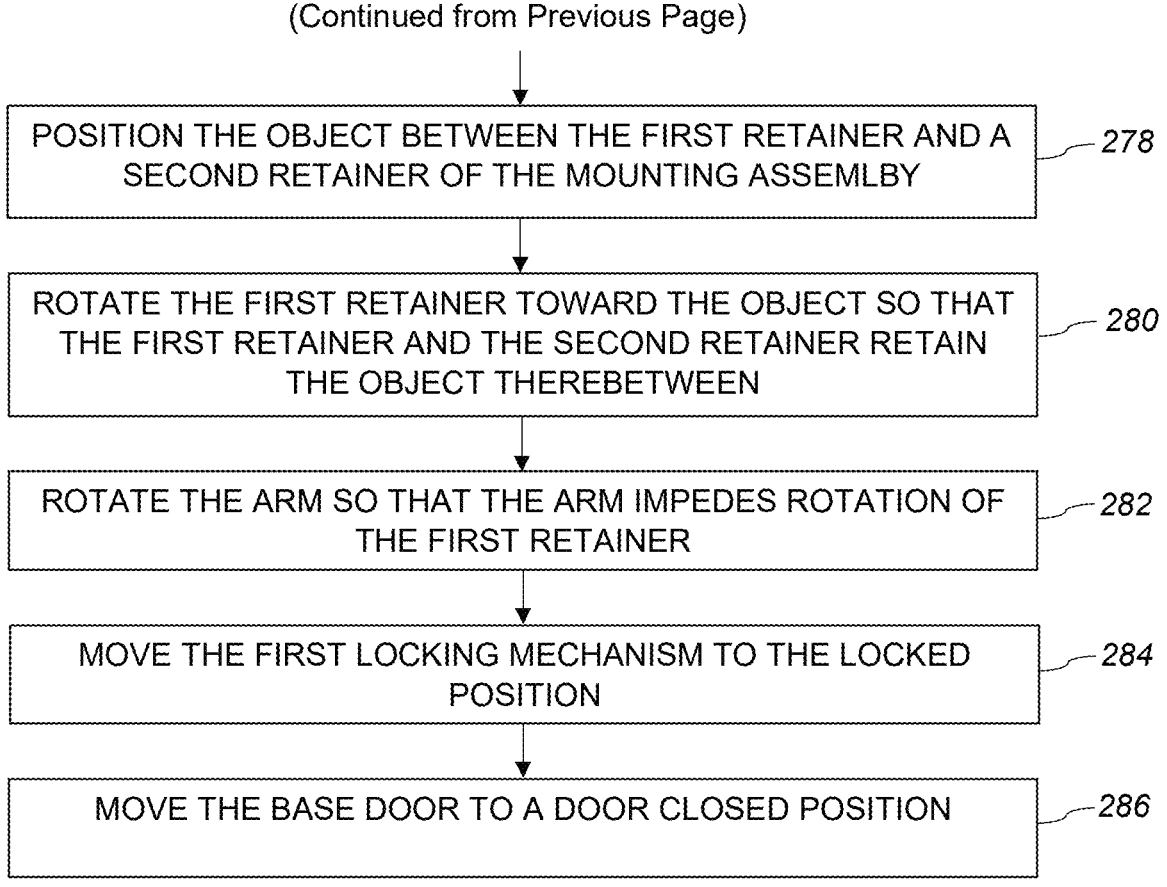

(Continued from Previous Page)

POSITION THE OBJECT BETWEEN THE FIRST RETAINER AND A SECOND RETAINER OF THE MOUNTING ASSEMLBY ——278

ROTATE THE FIRST RETAINER TOWARD THE OBJECT SO THAT THE FIRST RETAINER AND THE SECOND RETAINER RETAIN THE OBJECT THEREBETWEEN ——280

ROTATE THE ARM SO THAT THE ARM IMPEDES ROTATION OF THE FIRST RETAINER ——282

MOVE THE FIRST LOCKING MECHANISM TO THE LOCKED POSITION ——284

MOVE THE BASE DOOR TO A DOOR CLOSED POSITION ——286

FIG. 2 (Cont.)

MECHANICAL MOUNTING SYSTEM

RELATED APPLICATION

This application claims priority on U.S. Provisional Patent Application Ser. No. 63/620,244, filed on Jan. 12, 2024, and entitled "MECHANICAL MOUNTING SYSTEM". As far as permitted, the contents of U.S. Provisional Patent Application Ser. No. 63/620,244 are incorporated in their entirety herein by reference.

BACKGROUND

Mobile antennas that are capable of delivering broadband internet supporting streaming, online gaming, video calls, and more are becoming available to consumers. These mobile antennas are connected to advanced satellites, delivering high-speed, low-latency internet to users all over the world. One type of modern mobile consumer antenna includes a phased array antenna. The phase array antennas (such as the Starlink antenna, offered by SpaceX®) include Wi-Fi router technology and supporting components. Phase array antennas are often self-orienting and connect to satellites within minutes, so long as the antenna is in a clear view of the sky.

These phase array antennas can often withstand extreme cold, heat, hail, sleet, heavy rain, and gale-force winds, making them suitable for use in remote locations and/or mobile situations. Some phase array antennas must be used only at one location and have dynamic, moving parts that protrude outwardly from the antenna. These moving parts can block the motion of the antenna, if the antenna is mounted to another object, or if the antenna is positioned near another object. As a result, there are a number of issues with mounting modern antennas, including phase array antennas.

SUMMARY

The present invention is directed toward a mechanical mounting system for mounting an object to a vehicle exterior of a vehicle. In various embodiments, the mechanical mounting system comprises a base assembly and a mounting assembly. The base assembly is fixedly mountable to the vehicle exterior. The mounting assembly is movably coupled to the base assembly. The mounting assembly includes a mounting aperture. The mounting assembly is configured to receive the object so that at least a portion of the object is extendable through the mounting aperture.

In some embodiments, the mounting assembly is movable relative to the base assembly between an expanded configuration and a retracted configuration.

In certain embodiments, in the expanded configuration, the mounting assembly is configured to receive the object.

In various embodiments, in the retracted configuration, the mounting aperture is at least partially positioned within the mounting assembly.

In some embodiments, the mounting assembly includes a mounting frame that defines a mounting perimeter of the mounting assembly, the mounting frame being configured to slidingly engage a base frame of the base assembly.

In certain embodiments, the mounting assembly includes a first retainer that is configured to retain the object relative to the base assembly.

In various embodiments, the mounting assembly includes a mounting frame that defines a mounting perimeter of the mounting assembly, the first retainer being coupled to the mounting frame.

In some embodiments, the base assembly includes a second retainer that is configured to cooperate with the first retainer to retain the object between the first retainer and the second retainer.

In certain embodiments, the base assembly includes a base door that is configured to be moved to a door open position, in the door open position at least a portion of the object being positionable within an interior of the base frame.

The present invention is also directed toward a method for mechanically mounting an object to a vehicle exterior of a vehicle. In various embodiments, the method comprises the steps of fixedly mounting a base assembly of a mechanical mounting system to the vehicle exterior, movably coupling a mounting assembly to the base assembly, the mounting assembly including a mounting aperture, and receiving the object with the mounting assembly so that at least a portion of the object extends through the mounting aperture.

In various embodiments, the method further comprises the step of moving the mounting assembly relative to the base assembly between an expanded configuration and a retracted configuration.

In some embodiments, the mounting assembly includes a mounting frame that defines a mounting perimeter of the mounting assembly.

In certain embodiments, the method further comprises the step of slidingly engaging a base frame of the base assembly with the mounting frame.

In various embodiments, the method further comprises the step of moving a base door of the base assembly to a door open position, in the door open position at least a portion of the object being positionable within an interior of the base frame.

In some embodiments, the method further comprises the step of moving a first locking mechanism of the base assembly to an unlocked position.

In certain embodiments, the method further comprises the step of rotating an arm of the base assembly so that the arm no longer impedes rotation of a first retainer of the base assembly.

In various embodiments, the method further comprises the step of rotating the first retainer toward the base door.

In some embodiments, the method further comprises the step of rotating the first retainer toward the object so that the first retainer and the second retainer retain the object therebetween.

The present invention is also directed toward a mechanical mounting system for mounting an object to a vehicle exterior of a vehicle. The mounting system includes a base assembly and a mounting assembly. The base assembly is fixedly mountable to the vehicle exterior. The base assembly includes a base door and a base frame that defines a base perimeter of the base assembly. The base door is movable to a door open position. In the door open position, at least a portion of an object cable of the object is positionable within an interior of the base frame. A mounting assembly includes a mounting frame that defines a mounting perimeter of the mounting assembly. The base frame is coupled to the base frame. The mounting frame includes a mounting bottom having a mounting aperture that is adjustable. The mounting assembly being configured to receive the object so that at least a portion of the object is extendable through the mounting aperture. The mounting assembly being movable relative to the base assembly between an expanded configuration and a retracted configuration. The mounting assembly being configured to receive the object while in the expanded configuration. The mounting aperture being at least partially positioned within the mounting assembly while in the retracted configuration. The mounting frame being configured to slidingly engage the base frame of the base assembly. The mounting assembly including a first retainer that is configured to retain the object relative to the base assembly. The first retainer being coupled to the mounting frame.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its component and its operation, will be best understood from the accompanying drawings, taken in conjunction with the accompanying description, in which similar reference characters refer to similar parts, and in which:

FIG. 2 is a flowchart depicting one embodiment of a method for mechanically mounting an object to a vehicle exterior of a vehicle.

While embodiments of the present invention are susceptible to various modifications and alternative forms, specifics thereof have been shown by way of examples and drawings and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a mechanical mounting system for mounting an object to a vehicle. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention, as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming, but would nevertheless be a routine undertaking of engineering for those of ordinary skill in the art having the benefit of this disclosure.

It is further understood that although the description and drawings provided herein focus on mounting systems for mounting an object to a vehicle, it is appreciated that other components and/or devices similar to the object can be mounted to any suitable object, stationary or mobile, and other types of devices can somewhat similarly be mounted to cars, trucks, motor coaches, RVs, and/or other suitable types of vehicles. No limitations are intended by showing and describing one type of object or device being mounted over any other, or the objects or the devices being mounted to one type of vehicle over any other.

Figure 1A:
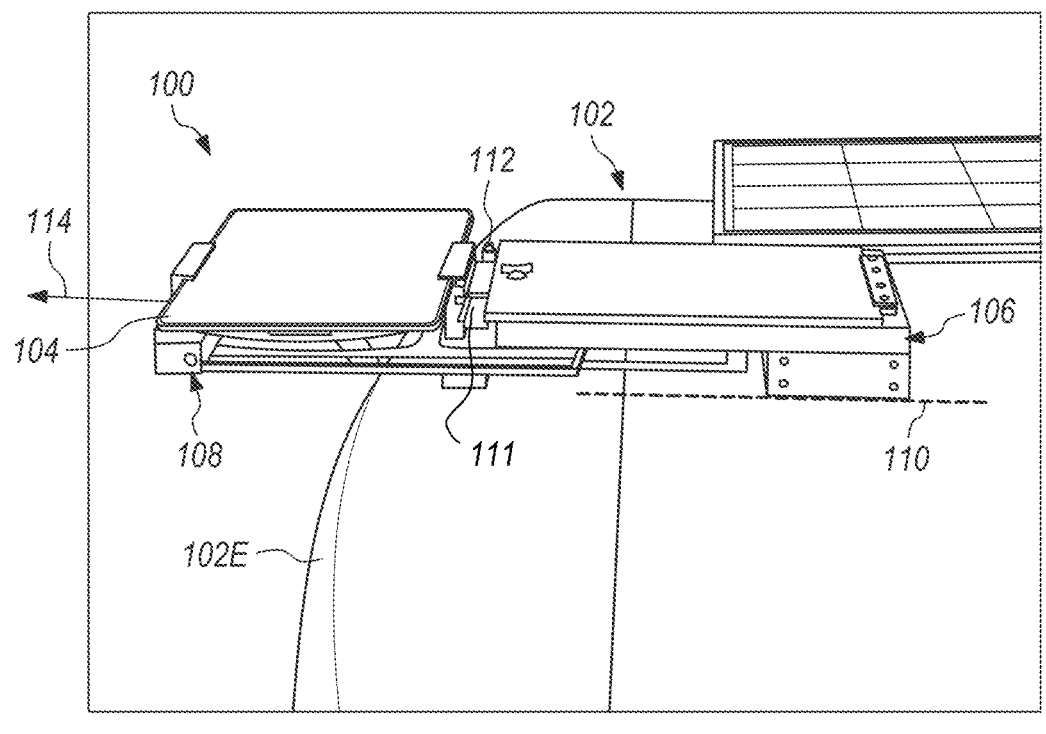
FIG. 1A is a side perspective view of an object and one embodiment of a mounting system for mounting an object to a vehicle, the mounting system having features of the present invention.

FIG. 1A is a side perspective view of a vehicle 102 and one embodiment of a mounting system 100 for mounting an object 104 to a vehicle exterior 102E of the vehicle 102. In FIG. 1A, the mounting system 100 is shown in a secured position. As used herein, the "secured position" is understood to mean secured, attached, fixed, or otherwise mounted to the vehicle 102.

The mounting system 100 removably and securely attaches and/or couples the object 104 to the vehicle 102. The mounting system 100 can also be in an unsecured position relative to the vehicle 102. As used herein, the term "unsecured position" is understood to mean not secured to the vehicle 102. Stated another way, "unsecured position" is intended to mean detached, disengaged, or otherwise not mounted to the vehicle 102. In other embodiments, devices or objects other than the object 104 shown and described herein can be mounted by the mounting system 100. The mounting system 100 can vary depending on the design requirements of the system, the vehicle 102, or the object 104 (or comparable, mountable device such as an antenna, which is a representation of one suitable object 104 shown in FIG. 1A).

It is understood that the mounting system 100 can include additional components, systems, subsystems, and elements than those specifically shown and/or described herein. Additionally, or alternatively, mounting system 100 can omit one or more of the components, systems, subsystems, and elements that are specifically shown and/or described herein.

The mounting system 100 can be mounted in any suitable location and/or position on the vehicle 102. In the embodiment depicted in FIG. 1A, the mounting system 100 is mounted to the vehicle exterior 102E (e.g., as illustrated in FIG. 1A, a roof) of the vehicle 102. In the embodiment illustrated by FIG. 1A, the vehicle 102 is a motor coach. Alternatively, the mounting system 100 can be used to mount the object 104 to non-vehicles. Non-exclusive, non-limiting examples of non-vehicles include houses, buildings, boats, docks, and/or structures. Components of the mounting system 100 can be interchanged, removed, or added so that the mounting system 100 can be mounted on any suitable vehicle 102.

The configuration of the mounting system 100 allows for less restricted movement and/or positioning of various components of the object 104 while the object 104 is mounted to the mounting system 100. For example, various components of the object 104 can move in a space near the mounting system 100 without coming into contact with the mounting system 100 or the vehicle 102. The mounting system 100 allows for the mounting and removal of the object 104 without the need to (i) detach the mounting system 100 from the vehicle 102, or (ii) modify the object 104 from its original form.

The mounting system 100 includes a base assembly 106 and a mounting assembly 108. Although one base assembly 106 and one mounting assembly 108 are illustrated in FIG. 1A, it is understood that the mounting system 100 can include any suitable number of base assemblies 106 and/or mounting assemblies 108 to mount any suitable number of objects 104.

The base assembly 106 can be selectively secured, attached, coupled, or otherwise fixedly fastened to the vehicle 102 so that the base assembly 106 is secured relative to the vehicle 102. The base assembly 106 can be selectively secured or otherwise attached to the vehicle exterior 102E (e.g., a roof) of the vehicle 102 (e.g., a motor coach, as one non-exclusive example). The base assembly 106 can provide a secured base and attachment structure for other components of the mounting system 100, such as the mounting assembly 108.

The design of the base assembly 106 can vary depending on the design requirements of the mounting system 100, the type, size, and/or configuration of the object 104, and/or the specifics of the vehicle 102. It is understood that the base assembly 106 can include additional components, systems, subsystems, and elements other than those specifically shown and/or described herein. Additionally, or alternatively, the base assembly 106 can omit one or more of the components, systems, subsystems, and elements that are specifically shown and/or described herein.

The base assembly 106 can be secured to the vehicle exterior 102E along a horizontal plane 110, shown as a dashed line in FIG. 1A. In some embodiments, above the horizontal plane 110, the object 104 can be mounted to the mounting system 100. Below the horizontal plane, the vehicle 102 can be mounted to the mounting system 100 at or around the horizontal plane 110. In various embodiments, the base assembly 106 can also include an arm 111 and a first locking mechanism 112.

The mounting assembly 108 can contain, mount, secure, couple, and/or retain the object 104. The mounting assembly 108 can slidingly engage the base assembly 106. The mounting assembly 108 is movable between an expanded configuration and a retracted configuration. The expanded configuration of the mounting assembly 108 is illustrated in FIGS. 1A-1E and 1H-1I. In the expanded configuration, the mounting assembly 108 is positioned to receive the object 104 or any other mountable device and/or component. In the retracted configuration, the mounting assembly 108 is positioned so that the mounting system 100 and/or the mounting assembly 108 has a reduced cross-sectional area. The retracted configuration of the mounting assembly 108 is shown in FIGS. 1F, 1G, and 1J.

Additionally, the mounting assembly 108 can be configured so that a portion of the object 104 can extend downwardly past the horizontal plane 110 so that the object 104 does not come into contact with the vehicle 102. The free movement of the portion of the object 104 that is below the horizontal plane 110 is one of the advantages provided by the embodiments of the mounting system 100.

The mounting assembly 108 can vary depending on the design requirements of the mounting system 100, the type, size, and/or configuration of the object 104, and/or the specifics of the vehicle 102. It is understood that mounting assembly 108 can include additional components, systems, subsystems, and elements other than those specifically shown and/or described herein. Additionally, or alternatively, the base assembly 106 can omit one or more of the components, systems, subsystems, and elements that are specifically shown and/or described herein.

The arm 111 fixedly secures a position of the object 104 within the mounting assembly 108. The arm 111 is movable between a closed configuration (illustrated in FIGS. 1A-1H) and an open configuration (illustrated in FIG. 1I). The arm 111 engages various subcomponents of the base assembly 106 and/or the mounting assembly 108, as shown and described in further detail herein. In the open configuration, the arm 111 is positioned so that the mounting assembly 108 can receive the object 104. In the closed position, the arm 111 is positioned so that the mounting assembly 108 is closed around the object 104, securing the object 104 within the mounting system 100.

The arm 111 can cooperate with other components and subcomponents of the base assembly 106 and/or the mounting assembly 108 to fixedly secure the position of the object 104 within the mounting assembly 108 and/or to unsecure the position of the object 104 for removal from the mounting assembly 108.

The arm 111 can vary depending on the design requirements of the mounting system 100, the specifics of the vehicle 102, the type, size, and/or configuration of the object 104, the base assembly 106, and/or the mounting assembly 108. It is understood that the arm 111 can include additional components, systems, subsystems, and elements other than those specifically shown and/or described herein. Additionally, or alternatively, the arm 111 can omit one or more of the components, systems, subsystems, and elements that are specifically shown and/or described herein. In some embodiments, the arm 111 can include a bracket.

The first locking mechanism 112 can be used to place the base assembly 106 and the mounting assembly 108 in a locked position. For example, in the embodiments where the first locking mechanism 112 is a locking pin, the locking pin slides through apertures (shown and described with respect to FIG. 1I) of the base assembly 106, the mounting assembly 108, and/or the arm 111 so that the locking pin impedes the movement of the base assembly 106, the mounting assembly 108, and/or the arm 111 relative to one another. In other embodiments, the mounting assembly 108 can selectively engage and lock to the base assembly 106 so that the mounting assembly 108 is in a locked position relative to the base assembly 106 without using the first locking mechanism 112. The mounting assembly 108 can selectively disengage and unlock from the base assembly 106 so that the mounting assembly 108 is in an unlocked position relative to the base assembly 106. In some embodiments, the first locking mechanism 112 fixedly secures the arm 111 in the closed configuration.

The first locking mechanism 112 can vary depending on the design requirements of the mounting system 100, the object 104, and/or the vehicle 102. It is understood that the first locking mechanism 112 can include additional components, systems, subsystems, and elements than those specifically shown and/or described herein. Additionally, or alternatively, the first locking mechanism 112 can omit one or more of the components, systems, subsystems, and elements that are specifically shown and/or described herein.

In various embodiments shown and described herein, such as FIG. 1A, the mounting assembly 108 is movable along at least a first axis 114 while the base assembly 106 is mounted to the vehicle 102 and the mounting assembly 108 is in the unlocked position.

As used herein, "first," "second," "third," etc., are interchangeably usable with respect to components of the mounting assembly 100. For example, the first locking mechanism 112 could be considered the "second" locking mechanism, and another locking mechanism could be considered the "first" locking mechanism. No limitation is intended by the use of numbering terminology.

Figure 1B:
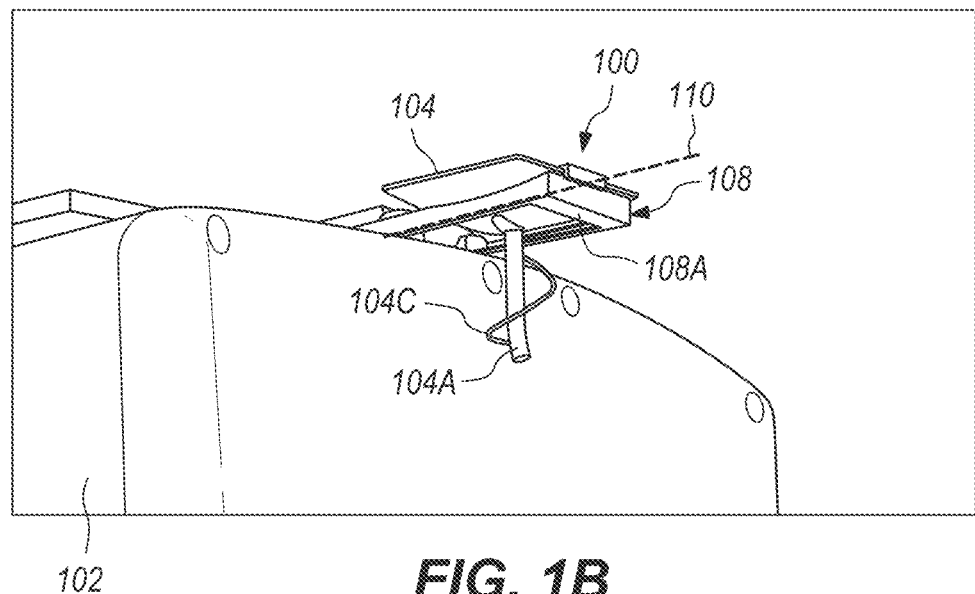
FIG. 1B is a bottom perspective view of the object and the embodiment of the mounting system shown in FIG. 1A.

FIG. 1B is a bottom perspective view of the vehicle 102, and the embodiment of the mounting system 100 shown in FIG. 1A. As shown in FIG. 1B, the object 104 can include an object arm 104A (or similar component) and an object cable 104C. The object arm 104A and the object cable 104C extend downwardly below the horizontal plane 110.

The mounting assembly 108 can include a mounting aperture 108A. As shown in FIG. 1B, the mounting aperture 108A can receive at least a portion of the object 104, such as the object arm 104A and/or the object cable 104C.

The object arm 104A can move in accordance with alignment programming for the object 104. The mounting system 100 allows the object arm 104A (or other portions of the object 104) to move in space below the horizontal plane 110 while the object 104 is operational and mounted to the vehicle 102 via the mounting assembly 108. This enables the mounting and operation of the object 104 without the need for modification.

Similarly, the object cable 104C can extend from the object 104 through the mounting aperture 108A, downwardly below the horizontal plane 110, and/or into the vehicle 102. The object cable 104C can extend from the object arm 104A (such as shown in FIG. 1B) to the interior of the base assembly 106 (such as shown in FIG. 1D) via a slot, hole, aperture, or suitable opening (not shown) in both the mounting assembly 108 and the base assembly 106, so that a length of the object cable 104C can be stored in an interior of the base assembly 106, such as shown in FIG. 1D. Any suitable portion of the object 104 can be positioned in the interior of the base assembly 106. Alternatively, other suitable components, elements, and/or structures can be positioned, stored, and/or retained in the interior of the base assembly 106.

Figure 1C:
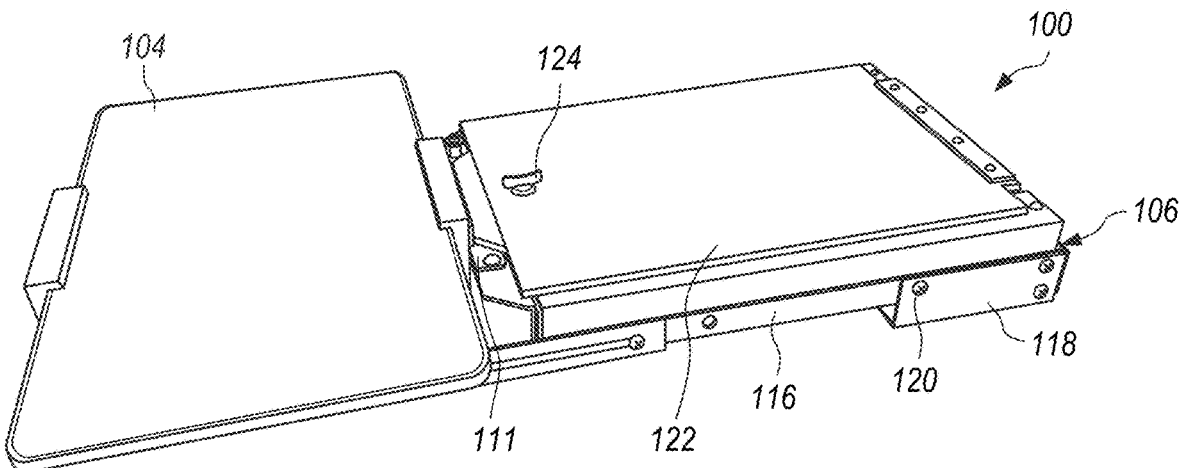
FIG. 1C is a perspective view of the object and the embodiment of the mounting system shown in FIG. 1A.
Figure 1D:
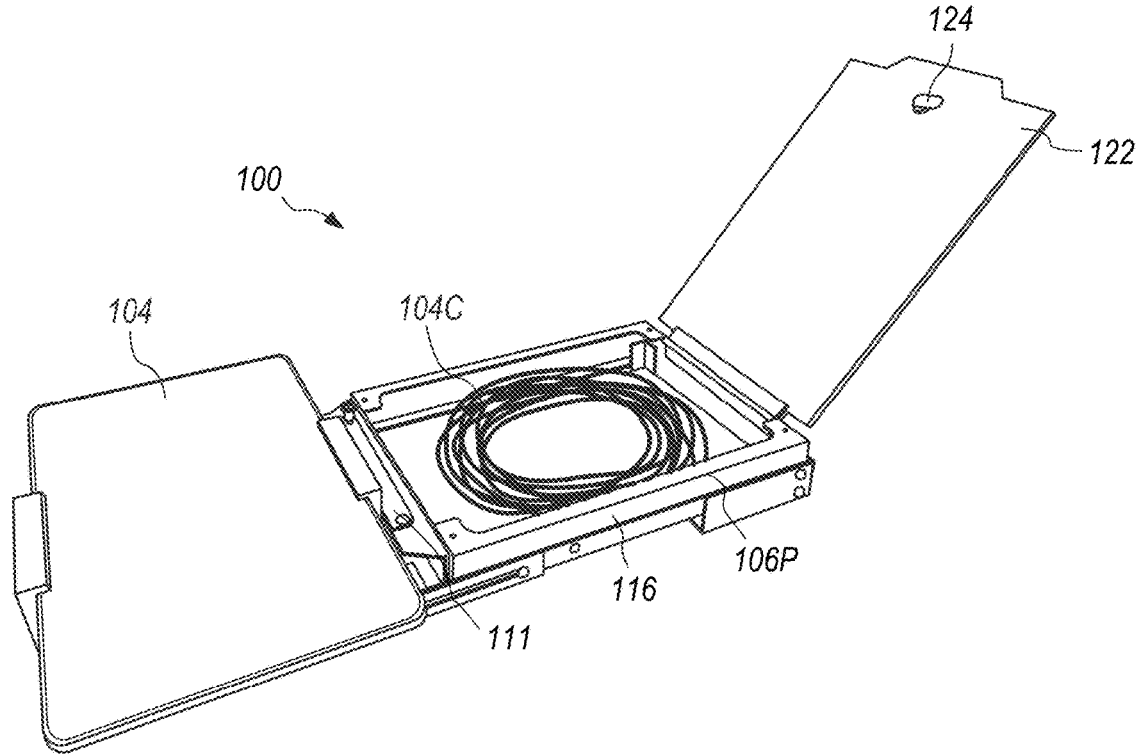
FIG. 1D is a perspective view of the object and the embodiment of the mounting system shown in FIG. 1A with a base door in a door open position.

FIG. 1C is a perspective view of the embodiment of the mounting system 100, shown in 1A, and an object 104 that is mounted to the mounting system 200. The base assembly 106 can include a base frame 116, a base foot 118, a base fastener 120, a base door 122, and/or a second locking mechanism 124.

It is recognized that the mounting system 100 can include additional components that have been omitted from FIGS.

1A-1J for clarity and ease of understanding. It is also recognized that the mounting system 100 can omit certain components illustrated in FIGS. 1A-1J. For example, the mounting system 100 can include certain additional components that are illustrated and/or described herein.

The base frame 116 can be formed as a central component for interconnecting various subcomponents of the base assembly 106 and/or the mounting assembly 108. For example, subcomponents such as the base foot 118, the base fastener 120, and/or the base door 122 can be coupled to the base frame 116.

The base frame 116 can vary depending on the design requirements of the mounting system 100, the base assembly 106, and/or the mounting assembly 108. The base frame 116 can be at least partially formed from any suitable material, including metals, plastics, and/or polymers, as non-limiting, non-exclusive examples. The base frame 116 can be formed in any suitable shape, including a substantially rectangular prism.

The base foot 118 can provide vertical spacing between the vehicle 102 (illustrated in FIGS. 1A-1B) and the base frame 116 while the mounting system 100 and/or the base assembly 106 are coupled to the vehicle 102. For example, the base foot 118 provides vertical clearance between the horizontal plane 110 (illustrated in FIG. 1A) and the base frame 116. The base foot 118 can be coupled to the base frame 116.

The base foot 118 can vary depending on the design requirements of the mounting system 100 and/or the base assembly 106. The base foot 118 can be at least partially formed from any suitable material, including metals, plastics, and/or polymers, as non-limiting, non-exclusive examples. While one base foot 118 is shown in the embodiment illustrated by FIG. 1C, it is appreciated that the base assembly 106 can include any suitable number of base feet 118. For example, while not visible in the view shown in FIG. 1C, an opposing base foot 118 can be coupled to the base frame 116 on the opposite side of the base frame 116 relative to the side shown in FIG. 1C so that the base assembly 106 can be mounted to be substantially parallel relative to the vehicle 102.

The base fastener 120 can selectively fasten and/or couple various subcomponents of the base assembly 106 relative to each other. As shown in FIG. 1C, the base foot 118 can be selectively coupled to the base frame 116 using the base fastener 120.

The base fastener 120 can vary depending on the design requirements of the mounting system 100, base assembly 106, and/or the mounting assembly 108. The base fastener 120 can be at least partially formed from any suitable material, including metals, plastics, and/or polymers, as non-limiting, non-exclusive examples.

While one base fastener 120 is labeled in the embodiment illustrated by FIG. 1C, it is appreciated that the base assembly 106 can include any suitable number of base fasteners 120, and it is understood that the unlabeled fasteners shown in FIG. 1C can be substantially similar to the base fastener 120 that is labeled in FIG. 1C.

The base door 122 is movably coupled to the base frame 116. The base door 122 can be movable between a door closed configuration (such as shown in FIG. 1C) and a door open position (such as shown in FIG. 1D). While the base door 122 is in the door closed configuration, the base door 122 can protect and/or house items for storage in the interior of the base frame 116. In some embodiments, the base door 122 is hingedly attached to the base frame 116. While in the door closed configuration, the base door 122 can engage the arm 111 to impede and/or inhibit the movement of the arm 111.

The base door 122 can vary depending on the design requirements of the mounting system 100, the base assembly 106, and/or the mounting assembly 108. The base door 122 can be at least partially formed from any suitable material, including metals, plastics, and/or polymers, as non-limiting, non-exclusive examples.

The second locking mechanism 124 can lock and unlock the position of the base door 122 relative to the base frame 116 while the base door 122 is in the door closed configuration. The second locking mechanism 124 can lock the position of the base door 122 by rotating the orientation of the second locking mechanism 124 so that the second locking mechanism 124 comes into contact with the base frame 116 while the base door 122 is in the door closed configuration.

The second locking mechanism 124 can vary depending on the design requirements of the mounting system 100, base assembly 106, and/or the mounting assembly 108. The second locking mechanism 124 can be at least partially formed from any suitable material, including metals, plastics, and/or polymers, as non-limiting, non-exclusive examples.

FIG. 1D is a perspective view of the embodiment of the mounting system 100 and the object 104 shown in FIG. 1C, with the base door 122 in the door open position. As shown in the embodiment illustrated by FIG. 1D, the base frame 116 defines a base perimeter 106P of the base assembly 106. Further, at least a portion of the object cable 104C can be positioned within the interior of the base frame 116, and the object cable 104C is accessible and/or visible while the base door 122 is in the door open position. In the embodiment illustrated in FIG. 1D, the object cable 104C is coiled for storage within the interior of the base frame 116. The second locking mechanism 124, which is positionable within an interior of the base frame 116, is also shown in FIG. 1D.

When the base door 122 is in the door open position, the object cable 104C can be removed and/or uncoiled so that when the object 104 is unmounted and/or removed from the mounting system 100, the object cable 104C is simultaneously removable from the interior of the base frame 116. This advantage (i) allows the object cable 104C to be unmodified during the use of the object 104 that is mounted in the mounting assembly 100, and (ii) removes the necessity for using a separate object cable 104C in each of the mounting assembly 100 and other use locations for the object. In other words, in the door open position, the base assembly 106 can store an excess length of the object cable 104C within the interior of the base frame 116 so that the object cable 104C can be uncoiled and/or extended from the object 104 so that the object cable 104C is usable in locations other than the mounting assembly 100.

Figure 1E:
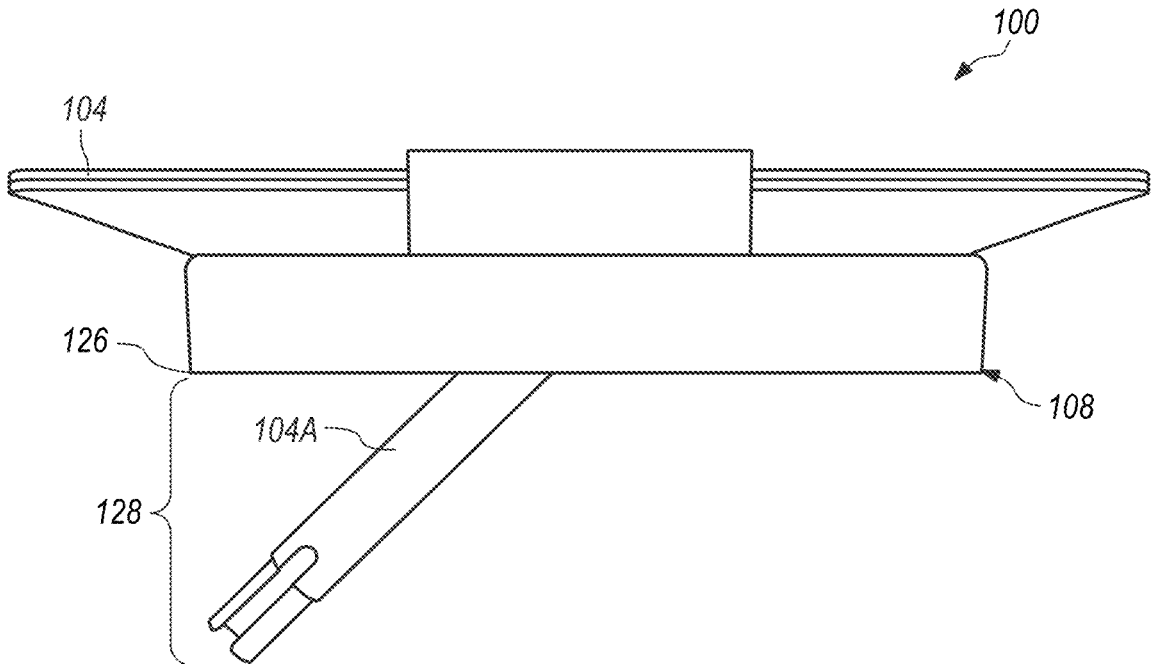
FIG. 1E is a front view of the object and the embodiment of the mounting system shown in FIG. 1A.
Figure 1F:
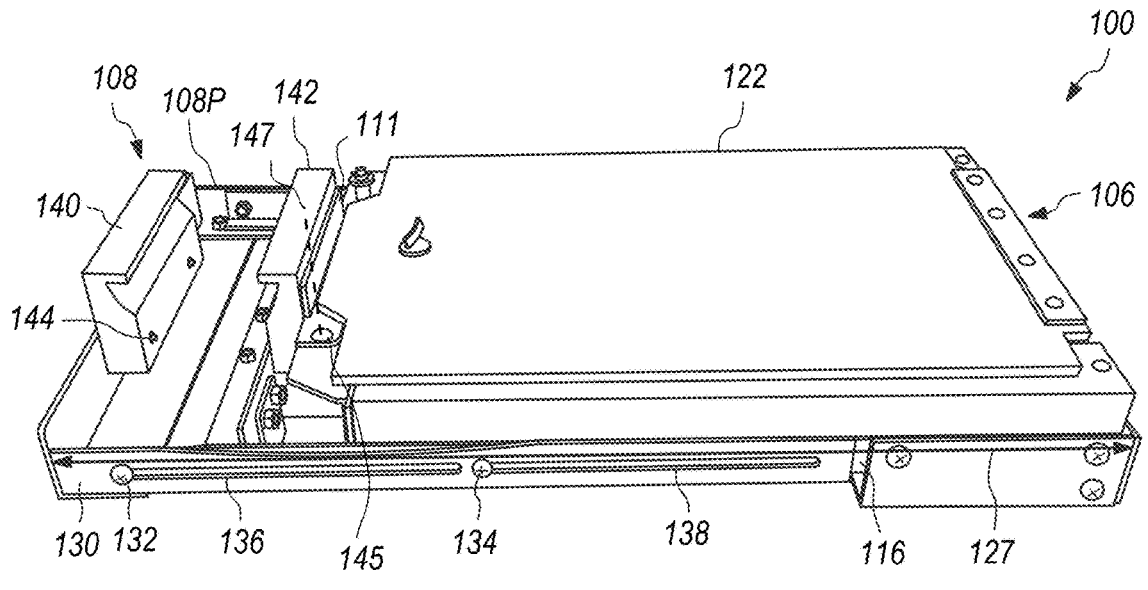
FIG. 1F is a side perspective of the embodiment of the mounting system shown in FIG. 1A, shown in a retracted configuration.
Figure 1G:
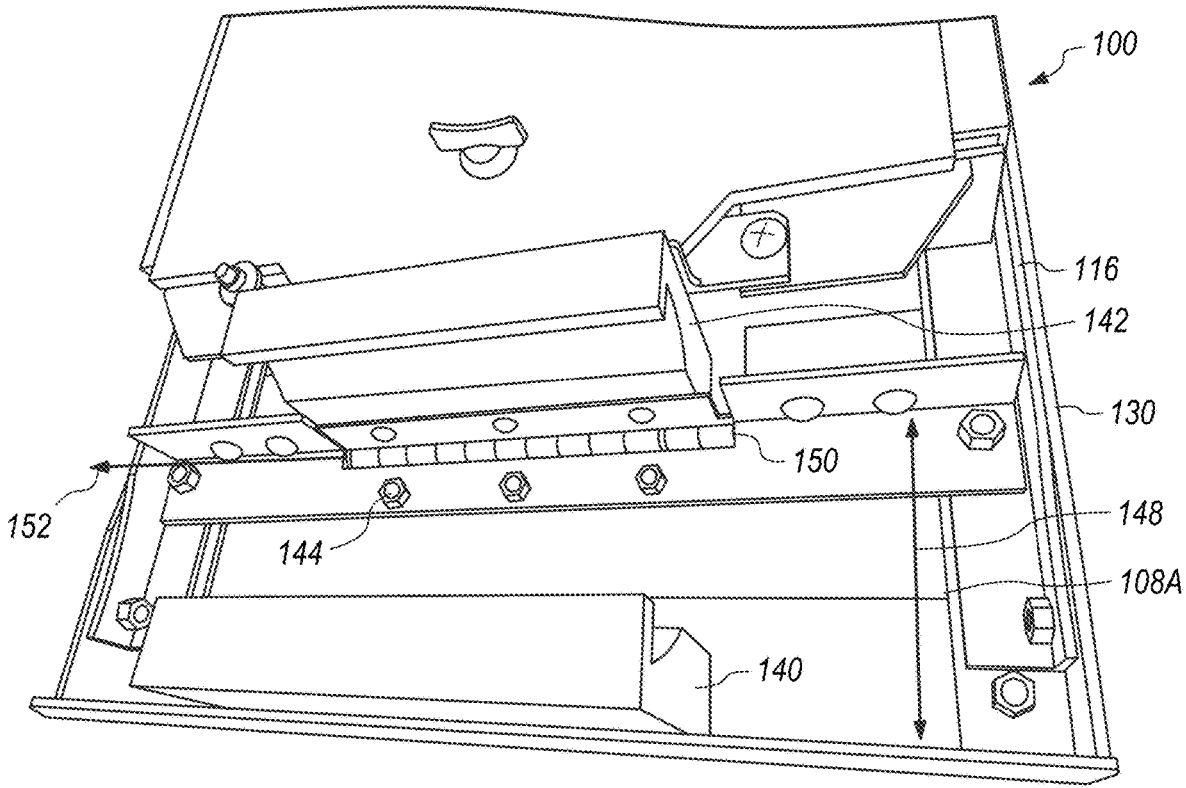
FIG. 1G is a top perspective view of a portion of the embodiment of the mounting system shown in FIG. 1A, shown in the retracted configuration.

FIG. 1E is a front view of the embodiment of the mounting system 100 and the object 104 shown in FIG. 1C. As shown in FIG. 1E, the object arm 104A can extend below a mounting bottom 126 of the mounting assembly 108. Although not shown in FIG. 1E, the mounting aperture 108A (for example, as illustrated in FIG. 1B) allows one or more portions of the object 104 (such as the object arm 104A, as shown in FIG. 1E) to extend through the mounting assembly 108 into an open space 128 below the mounting assembly 108.

FIG. 1F is a side perspective of the embodiment of the mounting system 100 illustrated in FIG. 1A, shown in a retracted configuration where the mounting system 100 has a closed length 127 indicated in FIG. 1F by the double arrow.

The closed length 127 shown in FIG. 1F is merely illustrative and indicates one possible length of the mounting system 100 in the retracted configuration. In the retracted configuration, a footprint of the mounting system 100 can be reduced. In one embodiment, the closed length 127 is approximately 25 inches. In other embodiments, the closed length 127 is greater than approximately 25 inches or less than approximately 25 inches.

It is recognized that the mounting system 100 can include additional components that have been omitted from FIGS. 1F-1J for clarity and ease of understanding. It is also recognized that the mounting system 100 can omit certain components illustrated in FIGS. 1F-1J. For example, the mounting system 100 can include certain additional components that were previously illustrated and/or described herein.

As shown in FIG. 1F, mounting system 100 can include a mounting frame 130, a first guide 132, and a second guide 134. The mounting frame 130 defines a mounting perimeter 108P of the mounting assembly 108. The mounting perimeter 108P can vary depending on the configuration of the mounting assembly 108 (e.g., the mounting perimeter 108P changes when the mounting assembly 108 moves between the retracted configuration shown in FIG. 1F and the expanded configuration illustrated in FIG. 1H).

The first guide 132 can extend through (i) a first groove 136 that is formed into the mounting frame 130 of the mounting assembly 108, and (ii) the base frame 116. Similarly, the second guide 134 can extend through (i) the second groove 138 that is formed into the mounting frame 130 of the mounting assembly 108, and (ii) the base frame 116.

The first guide 132 and the second guide 134 are fastenable so that a position of the mounting frame 130 is fixable relative to the base frame 116. When the first guide 132 and the second guide 134 are unfastened, the mounting assembly 108 is movable between the expanded and retracted configurations, and the first groove 136 and the second groove 138 are slidingly engaged by the first guide 132 and the second guide, so that the mounting frame 330 is movable in the directions defined by the first groove 136 and the second groove 138. In other words, the first guide 132 and the second guide 134 and the first groove 136, and the second groove 138 can work in cooperation to guide movement of the mounting frame 130 relative to the base frame 116.

The first guide 132 and the second guide 134 can vary depending on the requirements of the mounting system 100, the base assembly 106, and/or the mounting assembly 108. The first guide 132 and the second guide 134 can include fasteners and/or other suitable guiding components.

The first groove 136 and the second groove 138 allow the mounting frame 130 to be movable between the expanded and retracted configurations. The first groove 136 and the second groove 138 can vary depending on the requirements of the mounting system 100, the base assembly 106, and/or the mounting assembly 108. The first groove 136 and the second groove 138 can include any suitable shape.

The mounting assembly 108 can include a first retainer 140 that retains the object 104 to the base assembly 106. The first retainer 140 can be fixedly secured to the mounting frame 130. The first retainer 140 can vary depending on the requirements of the mounting system 100, the base assembly 106, and/or the mounting assembly 108. As a non-exclusive, non-limiting example, the first retainer 140 can include a clamp.

In certain embodiments, the base assembly 106 can include a second retainer 142. The second retainer 142 can work in cooperation with the first retainer 140 to retain and/or secure the object 104 between the first retainer 140 and the second retainer 142.

The second retainer 142 can vary depending on the requirements of the mounting system 100, the base assembly 106, and/or the mounting assembly 108. The second retainer 142 can include a clamp. The mounting system 100 can include more than two retainers as needed to secure the object 104. Alternatively, the mounting system 100 can include only the first retainer 140.

The first retainer 140 and the second retainer 142 can each be static or movable. For example, in one embodiment, the first retainer 140 is static, and the second retainer 112 is movable. In another embodiment, the first retainer 140 is movable, and the second retainer 142 is static. In yet another embodiment, both the first retainer 140 and the second retainer 142 are individually movable.

The base assembly 106 and/or the mounting assembly 108 can include a retainer fastener 144. The retainer fastener 144 can fixedly fasten the first retainer 140 to the mounting frame 130. In some embodiments, the retainer fastener 144 can fasten the second retainer 142 to the base frame 116. The retainer fastener 144 can vary depending on the requirements of the mounting system 100, the base assembly 106, and/or the mounting assembly 108. In some embodiments, the retainer fastener 144 can include a screw.

The base assembly 106 can include an arm fastener 145. The arm fastener 145 fastens the arm 111 to the base frame 116. The arm fastener 145 has an arm fastener axis 147. When the arm fastener 145 is unfastened, the arm 111 can rotate about the arm fastener axis 147. The arm fastener 145 can extend through an arm aperture (not shown) of the arm 111 and a base frame aperture (not shown). Both of these apertures can be threaded to receive corresponding threads of the arm fastener 145. The arm fastener 145 can vary depending on the requirements of the mounting system 100, the base assembly 106, and/or the mounting assembly 108. In some embodiments, the arm fastener 145 can include a screw.

FIG. 1G is a top perspective view of the embodiment of the mounting system 100 in FIG. 1F, shown in a retracted configuration with the object 104 removed. As shown in FIG. 1G, the mounting assembly 108 can include a mounting aperture 108A. The mounting aperture 108A provides spacing to receive a portion of the object 104, including the object arm 104A. The mounting aperture 108A has a cross-sectional area that is adjustable as the mounting assembly 108 moves between the expanded and retracted configurations. In the retracted configuration illustrated by FIG. 1G, the mounting assembly 108 has a first opening length 148 indicated by the double arrow.

In various embodiments, the base assembly 108 can include a retainer mover 150. The retainer mover 150 can move the first retainer 140 and/or the second retainer 142 about a mover axis 152. The retainer mover 150 can be hingedly secured and/or coupled to the first retainer 140 and/or the second retainer 142. As a non-exclusive, non-limiting example, the retainer mover 150 can include a hinge.

Figure 1H:
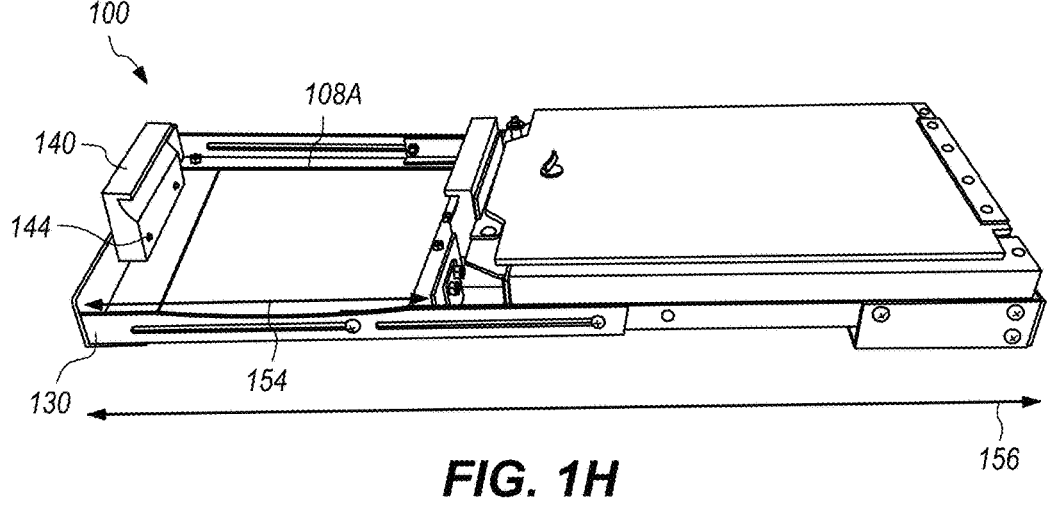
FIG. 1H is a side perspective of a portion of the embodiment of the mounting system shown in FIG. 1A, shown in an expanded configuration.

FIG. 1H is a side perspective of the embodiment of the mounting system 300 in FIG. 1F, shown in an expanded configuration with the object 102 removed. In the expanded configuration, the mounting assembly 108 has a second opening length 154, and the mounting system 100 has a system open length 156. The retainer fastener 144, shown in FIG. 1H, can fasten the first retainer 140 to the mounting frame 130.

Figure 1I:
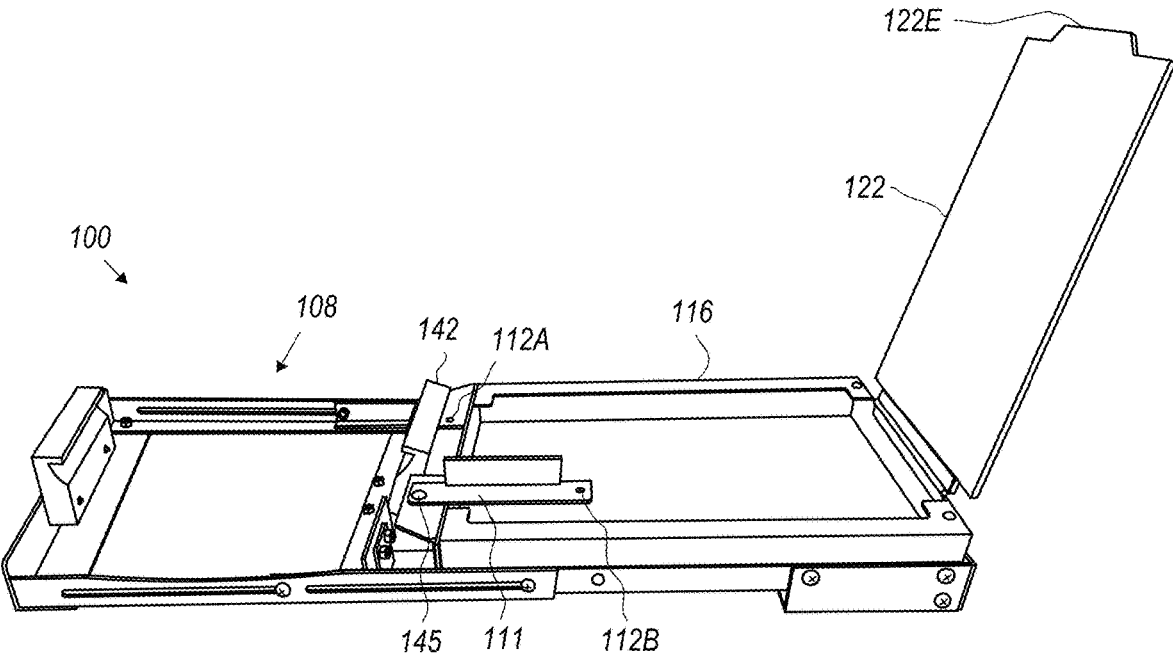
FIG. 1I is a side perspective of a portion of the embodiment of the mounting system shown in FIG. 1A, shown in the expanded configuration with an arm in the open configuration, a second retainer in a retainer open configuration, and the base door in the door open position.
Figure 1J:
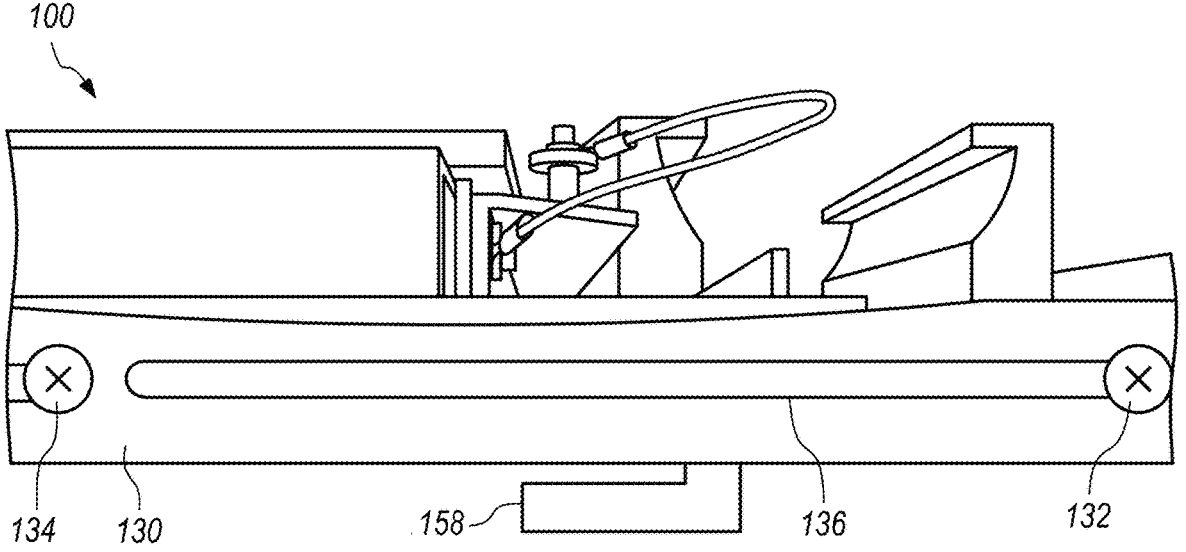
FIG. 1J is a side view of the embodiment of the mounting system shown in FIG. 1A, shown in a retracted configuration.

FIG. 1I is a side perspective of a portion of the embodiment of the mounting system 100 shown in FIG. 1A, shown in an expanded configuration with a second retainer 142 in an open configuration.

In FIG. 1I, the first locking mechanism 112 is removed, exposing a first locking aperture 112A of the base frame 116 and a second locking aperture 112B of the arm 111. With the first locking mechanism 112 removed from the first locking aperture 112A and the second locking aperture 112B, the arm 111 is in the unlocked position, allowing the free rotation of the arm 111 about the arm fastener axis 145 and the arm fastener axis 147. The arm 111 is rotatable at least 180 degrees about the arm fastener axis 147. In other embodiments, the arm 111 is rotatable a full 360 degrees about the arm fastener axis 147. In the embodiment illustrated in FIG. 1I, the arm 111 is rotated 90 degrees about the arm fastener axis 147 from the home position shown in FIG. 1H so that the arm extends toward the base door 122.

While the arm 111 is rotated to the position shown in FIG. 1I, the second retainer 142 is rotatable at least 10 to 15 degrees about the mover axis 152 (illustrated in FIG. 1G), toward the base frame 116 into a retainer open configuration. While the arm 111 is in the open configuration, as shown in FIG. 1I, the mounting assembly 108 has additional spatial clearance to accommodate the object 104 which can be mounted between the first retainer 140 (illustrated in FIG. 1H) and the second retainer 142.

When the arm 111 is rotated back to the position shown in FIG. 1H and the door 122 is moved back to the door closed position, a door end 122E of the door 122 can engage the arm 111 so that the door end 122E inhibits and/or impedes the movement of the arm 111 while the door 122 is in the door closed position. This provides additional securement of the arm 111, even when the first locking mechanism 112 is removed from the locking apertures 112A, 112B.

FIG. 1J is a side view of the embodiment of the mounting system 100 shown in FIG. 1F, shown in a retracted configuration with the object 104 removed. The mounting assembly 108 can include a mounting foot 158. The mounting foot 158 can provide vertical spacing between the vehicle 102 and the mounting frame 130 while the mounting assembly 108 and/or the base assembly 106 are coupled to the vehicle 102. For example, mounting foot 158 provides some vertical clearance between the vehicle 102 and the mounting frame 130. In some embodiments, the mounting foot 158 can be substantially similar in structure and/or design as the base foot 118 (illustrated in FIG. 1C).

The mounting foot 158 can vary depending on the design requirements of the mounting system 100, base assembly 106, and/or the mounting assembly 108. The mounting foot 158 can be at least partially formed from any suitable material, including metals, plastics, and/or polymers, as non-limiting, non-exclusive examples. While one mounting foot 158 is shown in the embodiment illustrated by FIG. 1F, it is appreciated that the mounting assembly 108 can include any suitable number of mounting feet 158 and that an opposing mounting foot 158 can be coupled to the mounting frame 130 on the opposite side of the mounting frame 130 relative to the side shown in FIG. 1F.

FIG. 2 is a flowchart depicting one embodiment of a method for mechanically mounting an object to a vehicle exterior of a vehicle. Although the method is described herein primarily in its potential use with vehicles, it is appreciated that the method can also be utilized to mount an object to any suitable structure.

It is understood that the various steps described herein can be modified as necessary for mechanically mounting the object. Additionally, it should also be appreciated that in certain applications, the order of the steps can be modified, certain steps can be omitted, and/or additional steps can be added without limiting the intended scope and breadth of the present invention.

It is further understood that the mechanical mounting system, including the base assembly, the mounting assembly, and other subcomponents, can be substantially similar in form and/or function to those embodiments previously described herein. Additionally, it is understood that the steps in the method for mechanically mounting an object to a vehicle exterior of a vehicle can utilize any of those embodiments of the mechanical mounting system or, in the alternate, any suitable mechanical mounting system.

At step 260, a base assembly of a mechanical mounting system is fixedly mounted to the vehicle exterior of the vehicle.

At step 262, a mounting assembly is movably coupled to the base assembly, the mounting assembly including a mounting aperture. The mounting assembly can include a mounting frame that defines a mounting perimeter of the mounting assembly. The mounting assembly can include a first retainer that is configured to retain the object relative to the base assembly. The mounting assembly can include a mounting frame that defines a mounting perimeter of the mounting assembly, the first retainer being coupled to the mounting frame. The base assembly can include a second retainer that is configured to cooperate with the first retainer to retain the object between the first retainer and the second retainer. The base assembly can include a retainer mover that is configured to move the second retainer about a mover axis so that a position of the second retainer is adjustable. The base assembly can include a base door that is hingedly attached to the base frame. The base door is movable between a door expanded configuration and a door retracted configuration. The object cable can include a cable length that is positionable within an interior of the base frame so that the object cable is accessible while the base door is in the door expanded configuration.

At step 264, the object is received with the mounting assembly so that at least a portion of the object extends through the mounting aperture. The base frame can be configured to receive an object cable of the object.

At step 266, the mounting assembly is moved relative to the base assembly between an expanded configuration and a retracted configuration. In the expanded configuration, the mounting assembly is configured to receive the object. In the retracted configuration, the mounting aperture is at least partially positioned within the mounting assembly.

At step 268, a base frame of the base assembly slidingly engaged with a mounting frame of the mounting assembly. The base frame can be formed as a central component for interconnecting various subcomponents of the base assembly and/or the mounting assembly. For example, subcomponents such as the base foot, the base fastener, and/or the base door can be coupled to the base frame.

At step 270, a base door of the base assembly is moved to a door open position. The base door is movably coupled to the base frame. The base door can be movable between a door closed configuration (such as shown in FIG. 1C) and a door open position (such as shown in FIG. 1D). While the base door is in the door closed configuration, the base door can protect and/or house items for storage in the interior of the base frame. In some embodiments, the base door is hingedly attached to the base frame. While in the door closed configuration, the base door can engage the arm to impede and/or inhibit the movement of the arm.

At step 272, a first locking mechanism of the base assembly is moved to the unlocked position. The first locking mechanism can be used to place the base assembly and the mounting assembly in a locked position. For example, in the embodiments where the first locking mechanism is a locking pin, the locking pin slides through apertures (not shown) of the base assembly, the mounting assembly, and/or the arm so that the locking pin impedes the movement of the base assembly, the mounting assembly, and/or the arm relative to one another. In other embodiments, the mounting assembly can selectively engage and lock to the base assembly so that the mounting assembly is in a locked position relative to the base assembly without using the first locking mechanism. The mounting assembly can selectively disengage and unlock from the base assembly 106 so that the mounting assembly is in an unlocked position relative to the base assembly 106. In some embodiments, the first locking mechanism also fixedly secures the arm in the closed configuration.

At step 274, the arm of the base assembly is rotated so that the arm no longer impedes the rotation of a first retainer of the base assembly. The arm fixedly secures a position of the object within the mounting assembly. The arm is movable between a closed configuration (illustrated in FIGS. 1A-1H) and an open configuration (illustrated in FIG. 1I). The arm engages various subcomponents of the base assembly and/or the mounting assembly, as shown and described in further detail herein. The arm can cooperate with other components and subcomponents of the base assembly and/or the mounting assembly to fixedly secure the position of the object within the mounting assembly and/or to unsecure the position of the object for removal from the mounting assembly.

At step 276, the first retainer of the base assembly is rotated toward the base door. The first retainer can be fixedly secured to the mounting frame. As a non-exclusive, non-limiting example, the first retainer can include a clamp.

At step 278, the object is positioned between the first retainer and a second retainer of the mounting assembly. The first retainer and the second retainer can each be static or movable. For example, in one embodiment, the first retainer is static, and the second retainer is movable. In another embodiment, the first retainer is movable, and the second retainer is static. In yet another embodiment, both the first retainer and the second retainer are individually movable.

At step 280, the first retainer of the base assembly is rotated toward the object so that the first retainer and the second retainer retain the object therebetween.

At step 282, the arm of the base assembly is rotated so that the arm impedes the rotation of the first retainer of the base assembly.

At step 284, the first locking mechanism is moved to the locked position.

At step 286, the base door of the base assembly is moved to a door closed position.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the mechanical mounting system and methods have been illustrated and described herein, one or more features of any one embodiment can be combined with one or more features of one or more of the other embodiments, provided that such combination satisfies the intent of the present invention.

While a number of exemplary aspects and embodiments of the mounting system and methods have been discussed above, those of skill in the art will recognize certain modifications, permutations, additions, and sub-combinations thereof. It is, therefore, intended that the following appended claims and claims hereafter introduced are interpreted to include all such modifications, permutations, additions, and sub-combinations as are within their true spirit and scope, and no limitations are intended to the details of construction or design herein shown.

What is claimed is:

1. A mechanical mounting system for mounting an object to a vehicle exterior of a vehicle, the mechanical mounting system comprising:
   a base assembly that is fixedly mountable to the vehicle exterior; and
   a mounting assembly that is movably coupled to the base assembly, the mounting assembly including a mounting aperture, the mounting assembly being configured to receive the object so that at least a portion of the object is extendable through the mounting aperture, the mounting system including a first retainer that is configured to retain the object relative to the base assembly, the base assembly includes a second retainer that is configured to cooperate with the first retainer to retain the object between the first retainer and the second retainer.

2. The mechanical mounting system of claim 1 wherein the mounting assembly is movable relative to the base assembly between an expanded configuration and a retracted configuration.

3. The mechanical mounting system of claim 2 wherein in the expanded configuration, the mounting assembly is configured to receive the object.

4. The mechanical mounting system of claim 2 wherein in the retracted configuration, the mounting aperture is at least partially positioned within the mounting assembly.

5. The mechanical mounting system of claim 1 wherein the mounting assembly includes a mounting frame that defines a mounting perimeter of the mounting assembly, the mounting frame being configured to slidingly engage a base frame of the base assembly.

6. The mechanical mounting system of claim 1 wherein the mounting assembly includes a mounting frame that defines a mounting perimeter of the mounting assembly, the first retainer being coupled to the mounting frame.

7. The mechanical mounting system of claim 1 wherein the base assembly includes a base door that is configured to be moved to a door open position, in the door open position at least a portion of the object being positionable within an interior of the base frame.

8. The mechanical mounting system of claim 7 wherein the base door is hingedly attached to a base frame of the base assembly.

9. The mechanical mounting system of claim 7 wherein, in the door open position, the base assembly is configured to store an excess length of an object cable of the object within an interior of a base frame of the base assembly.

10. The mechanical mounting system of claim 7 the base door is configured to be moved to a door closed position, in the door closed position, the base door is configured to protect items for storage in an interior of a base frame of the base assembly.

11. The mechanical mounting system of claim 10, in the door closed position, the base door is configured to engage an arm of the base assembly to inhibit movement of the arm.

12. The mechanical mounting system of claim 7 wherein the base door is movably coupled to a base frame of the base assembly.

13. A method for mechanically mounting an object to a vehicle exterior of a vehicle, the method comprising the steps of:
   fixedly mounting a base assembly of a mechanical mounting system to the vehicle exterior;
   movably coupling a mounting assembly to the base assembly, the mounting assembly including a mounting aperture;
   receiving the object with the mounting assembly so that at least a portion of the object extends through the mounting aperture;
   moving a base door of the base assembly to a door open position, in the door open position at least a portion of the object being positionable within an interior of the base frame;
   moving a first locking mechanism of the base assembly to an unlocked position;
   rotating an arm of the base assembly so that the arm no longer impedes rotation of a first retainer of the base assembly;
   rotating the first retainer toward the base door;
   positioning the object between the first retainer and a second retainer of the mounting assembly; and
   rotating the first retainer toward the object so that the first retainer and the second retainer retain the object therebetween.

14. The method of claim 13 further comprising the step of moving the mounting assembly relative to the base assembly between an expanded configuration and a retracted configuration.

15. The method of claim 13 wherein the mounting assembly includes a mounting frame that defines a mounting perimeter of the mounting assembly.

16. The method of claim 15 further comprising the step of slidingly engaging a base frame of the base assembly with the mounting frame.

17. The method of claim 13 further comprising the step of moving a base door of the base assembly to a door open position, in the door open position at least a portion of the object being positionable within an interior of the base frame.

18. The method of claim 17 further comprising the step of moving a first locking mechanism of the base assembly to an unlocked position.

19. A mechanical mounting system for mounting an object to a vehicle exterior of a vehicle, the mechanical mounting system comprising:
   a base assembly that is fixedly mountable to the vehicle exterior, the base assembly including a base door and a base frame that defines a base perimeter of the base assembly, the base door being movable to a door open position, in the door open position at least a portion of an object cable of the object being positionable within an interior of the base frame; and
   a mounting assembly including a mounting frame that defines a mounting perimeter of the mounting assembly, the mounting frame including a mounting bottom having a mounting aperture that is adjustable, the mounting assembly being configured to receive the object so that at least a portion of the object is extendable through the mounting aperture, the mounting 5 assembly being movable relative to the base assembly between an expanded configuration and a retracted configuration, the mounting assembly being configured to receive the object while in the expanded configuration, the mounting aperture being at least partially 10 positioned within the mounting assembly while in the retracted configuration, the mounting frame being configured to slidingly engage the base frame of the base assembly, the mounting assembly including a first retainer that is configured to retain the object relative to 15 the base assembly, the first retainer being coupled to the mounting frame.

\* \* \* \* \*